Patented Mar. 16, 1954

2,672,474

UNITED STATES PATENT OFFICE 2,672,474

BIS-TRIORGANOSILYL-SUBSTITUTED KETONES

Leo H. Sommer, State College, Pa., assignor to Dow Corning Corporation, Midland, Mich., a corporation of Michigan No Drawing. Application December 13, 1951, Serial No. 261,602

5 Claims. (Cl. 260—448.2)

This invention relates to ketones having two triorganosilyl groups and one carbonyl group in the molecule.

It is an object of this invention to prepare new compositions of matter which are useful as additives for siloxanes and as intermediates in the preparation of siloxane polymers containing functional groups.

In this application Me designates a methyl radical and Et an ethyl radical.

This invention relates to ketones of the formula $[RMe_2Si(CH_2)_n]_2CO$ where R is a phenyl or methyl radical and $n$ has a value from 2 to 5 inclusive.

The above ketones are prepared by the hydrolysis and decarboxylation of ketoesters of the formula $$RMe_2Si(CH_2)_{n-1}CHCOOEt$$
$$|$$
$$RMe_2Si(CH_2)_nCO$$

where R and $n$ are as above defined, by treating these esters with a strong acid such as HCl, $H_2SO_4$ or $HNO_3$.

The beta-ketoesters are prepared by the intermolecule condensation of esters of the formula $RMe_2Si(CH_2)_nSiCOOR'$ where R' is any alkyl radical, in the presence of sodium alkoxides or diisopropylammonium magnesiumbromide. The synthesis of the ketones may be represented by the schematic equation $$2RMe_2Si(CH_2)_nCOOR' + NaOR'$$

or $(Me_2CH)_2NMgBr \longrightarrow$

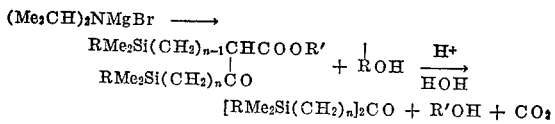

$[RMe_2Si(CH_2)_n]_2CO + R'OH + CO_2$

The esters employed as starting materials in the above equation may be prepared by esterifying acids of the formula $RMe_2Si(CH_2)_nCOOH$ or acyl chlorides of the formula

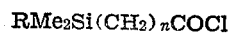

with alcohols in the conventional manner normally employed in organic chemistry. These acids and acyl chlorides are described and claimed in the applicant's copending applications Serial Nos. 155,782, 155,784 and 155,786, all filed April 13, 1950 and all assigned to the assignee of this invention.

The products of this invention are useful as intermediates in the preparation of siloxane polymers.

The following examples are illustrative only and are not to be construed as limiting the invention which is properly delineated in the appended claims.

Example 1

50.7 grams of diisopropylamine was added to a solution of .6 gram mols of ethyl magnesiumbromide and 300 ml. of ether at a rate sufficient to cause gentle reflux. Stirring was continued until no further ethane was evolved. There was then added with stirring and at sufficient rate as to maintain a gentle reflux of the ether, 0.6 gram mols of ethyl-beta-trimethylsilyl propionate $[Me_3Si(CH_2)_2COOEt]$. The mixture was heated on a hot water bath for an additional half hour and then stirred at room temperature for 2 hours.

The reaction mixture was then poured into a mixture of 600 grams of cracked ice and 110 ml. of concentrated hydrochloric acid. Additional hydrochloric acid was added and the organic layer was separated and the aqueous layer washed with two 100 cc. portions of ether. The organic layer and the ether extract were combined and washed with water and 10 per cent sodium bicarbonate solution and finally with water. The crude material was dried and distilled whereupon there was obtained 73.5 grams of the beta-ketoester having the formula

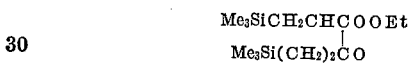

This ester had a refractive index of 1.4473 at 20° C. and boiled at 161° C. at 8 mm. pressure.

The above beta-ketoester was added to a mixture of 14 mols of concentrated sulphuric acid, 9 mols of water and 73 mols glacial acetic acid. The mixture was heated to boiling and vigorous evolution of gas occurred. When the gas evolution ceased, the contents were cooled and diluted with 160 ml. each of water and ether. 20 per cent NaOH solution was added to make the solution alkaline. The ether layer was separated and the aqueous layer was extracted with ether. The various ether layers were combined and dried over sodium sulphate and the resulting material was distilled. The ketone 2,2,8,8-tetramethyl-2,8-disila-5-nonaneone, $[Me_3Si(CH_2)_2]_2CO$, was obtained in 80 per cent yield. The ketone had a refractive index of 1.4414 at 20° C. and boiled at 103° C. at 7 mm. pressure.

Example 2

By employing the procedure of Example 1 with the exception that ethyl-beta-phenyldimethylsilyl propionate was employed as the ester, the diketone 2,8-diphenyl-2,8-dimethyl-2,8-disila-5-nonaneone was obtained. This material has a formula $[C_6H_5Me_2Si(CH_2)_2]_2CO$.

*Example 3*

Following the procedure of Example 1 and employing the following esters shown below, the corresponding ketones shown in the table were obtained:

| Ester | Ketone Obtained |
|---|---|
| $Me_3Si(CH_2)_3COOEt$ | $[Me_3Si(CH_2)_3]_2CO$ |
| $Me_3Si(CH_2)_4COOEt$ | $[Me_3Si(CH_2)_4]_2CO$ |
| $C_6H_5Me_2Si(CH_2)_5COOEt$ | $[C_6H_5Me_2Si(CH_2)_5]_2CO$ |

That which is claimed is:

1. A ketone of the formula $$[RMe_2Si(CH_2)_n]_2CO$$

where R is selected from the group consisting of methyl and phenyl radicals and $n$ has a value from 2 to 5 inclusive.

2. A ketone of claim 1 where $n$ is 2.
3. A ketone of claim 1 where $n$ is 3.
4. A ketone of claim 1 where $n$ is 4.
5. A ketone of claim 1 where $n$ is 5.

LEO H. SOMMER.

No references cited.